United States Patent [19]
Bennington et al.

[11] 3,834,555
[45] Sept. 10, 1974

[54] ARTICLE TRANSFER APPARATUS

[75] Inventors: Russell J. Bennington, Maple Glen; Laszlo G. Szalay, Norristown, both of Pa.

[73] Assignee: The Budd Company, Troy, Mich.

[22] Filed: Dec. 4, 1972

[21] Appl. No.: 312,083

[52] U.S. Cl............................. 214/1 BT, 214/1 BH
[51] Int. Cl............................................. B65g 29/00
[58] Field of Search... 214/1 BS, 1 BT, 1 BH, 1 BV, 214/ 1 B, 1 BB, 1 BC, 1 BD, 1 CM

[56] References Cited
UNITED STATES PATENTS

| | | | |
|---|---|---|---|
| 3,212,649 | 10/1965 | Johnson | 214/1 BC |
| 3,667,114 | 6/1972 | Smith | 214/1 BB |
| 3,718,216 | 2/1973 | Wilson | 214/1 BC |
| R25,889 | 10/1965 | Willsea | 214/1 BC |

*Primary Examiner*—Robert J. Spar
*Assistant Examiner*—George Abraham

[57] ABSTRACT

Article transfer apparatus which has independent actions subject to programmed teach sequence and programmed teach motions for removing articles from one unit, such as a press, and moving them while positively held by a single engaging element to another fixed location or station, such as another press; the article engaging means having a bending movement, a swivelling movement, a horizontal traversing reciprocating movement, a vertical bodily elevating movement, and a turning movement about a vertical axis. In a preferred embodiment, paired units are employed on a common turning mount to minimize press stoppage time.

3 Claims, 22 Drawing Figures

ARTICLE TRANSFER APPARATUS

BACKGROUND

Heretofore there have been known mechanisms for transferring articles between stations, such as presses, which shifted the article or workpiece from one holding device to another between stations. The U.S. Pat. Nos. of Watter, 2,815,866 and 2,856,079 illustrate such mechanisms. There have also been mechanisms which tilted the article carrier upward and downward in transferring articles. The U.S. Pat. of Dunne et al 3,661,051 illustrates such mechanisms in single unit form. There have been many other article handling mechanisms of various forms for various types of service but none known for performing the kind of service provided by the present invention.

SUMMARY OF INVENTION

According to the present invention, article transfer apparatus is provided which positively holds an article by a single engaging element throughout its entire transfer movement from one station to another and which has independent separately controllable programmable teach movements of bending and swivelling to conform to the article and reciprocating, elevating and turning movements to effect the article transfer. In a preferred form two transfer mechanisms or units are provided on a single turnable mount, each having independent movements except rotation. Electro-mechanical actuating means are employed to avoid fluid-actuated intermediaries and to assure more responsive and programmable controls. The invention also includes verious improvements in details.

DRAWINGS

The invention will be described in connection with an exemplary embodiment shown in the accompanying drawings, wherein.

SPECIFIC EMBODIMENT

The embodiment herein illustrated has two article handling units mounted on a common turnable column or turret for moving articles from one press to another in an article forming line.

Figure 1:
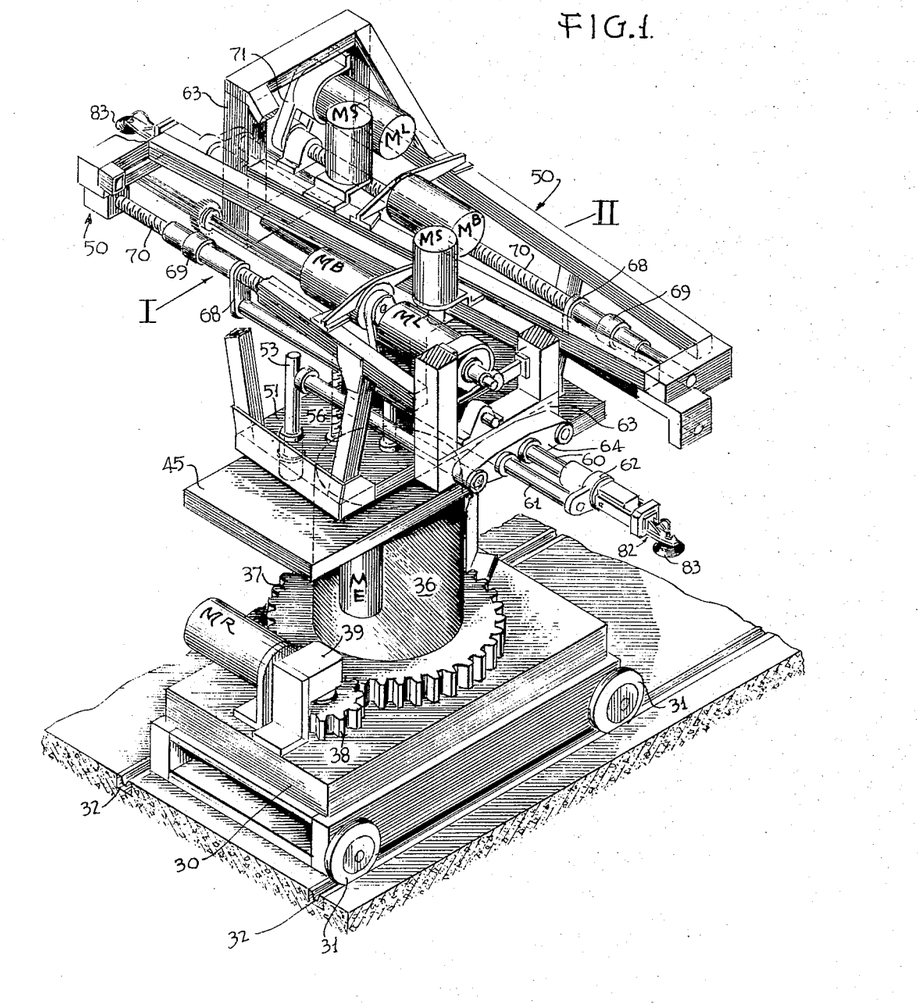
FIG. 1 is a vertical elevation in perspective, viewed somewhat from above and with some parts broken away, of article transfer apparatus embodying the invention.

The general assembly is shown in FIG. 1. It comprises a main base 30 mounted on wheels 31 movable along track rails 32 so as to be movable into and out of position between adjacent units of a line of presses. When the transfer apparatus is in the proper operating position between press units or whatever stations it is to serve, it may be anchored securely in any suitable manner, not shown.

Upon the base 30 (FIG. 5) there is rigidly secured a vertical pedestal 35 on which a column or turret 36 is rotatably mounted on suitable bearings.

Figure 5:
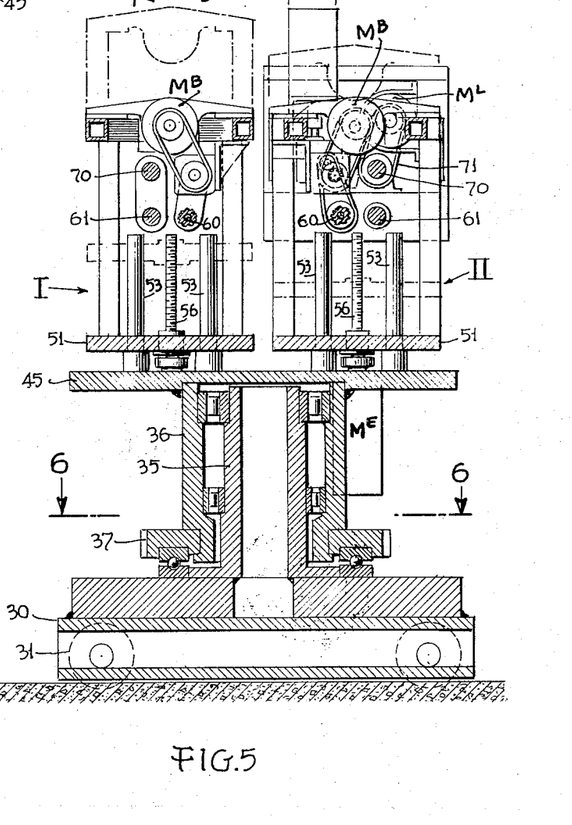
FIG. 5 is a vertical section, with a raised position shown in broken lines, taken on the line 5—5 of FIGS. 2 and 7.
Figure 6:
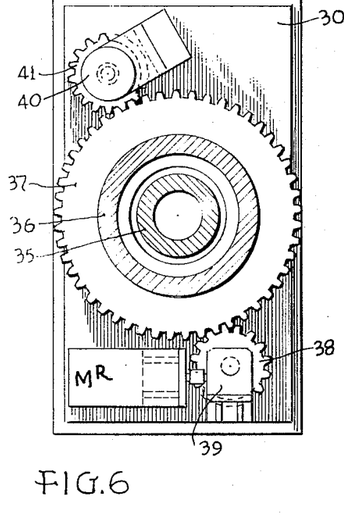
FIG. 6 is an enlarged horizontal section taken on the line 6—6 of FIG. 5.

The column 36 is turned by suitable means, here a ring gear 37 being secured to the base of the column and driven by a pinion gear 38 from gear box 39 and a programmable teach electric motor MR (motor-rotating).

The column with its supported mechanisms is quite heavy and since it is turned quite rapidly it has considerable stopping inertia. To provide quick accurate stops, an electrically actuated brake device 40, with a gear 41 engaging ring gear 37, is provided to act in sequence with the turning means. Other drive mechanisms which are provided herein may have separate braking devices if desired; but since the parts are lighter and the drives are of a type which hold more readily in stopped positions, no other separate stop devices are shown.

The column or turret 36 carries a table 45 on which are mounted two article handling mechanisms, which will be generally designated as I and II. The handling mechanisms are alike and have like parts but operate at different times so are separately controlled from a common programmed teach circuit which need not be disclosed herein. Since parts of the twin handling machanisms are alike the same reference characters will be used for both in the following description of one of them.

Each handling unit has the following possible movements. First, there is a bodily elevating movement which provides for raising or lowering an article in a press. The term "elevating" is meant to distinguish from devices which have a tilting movement which raises or lowers only the article engaging element alone.

Second, there is a linear or reciprocatory translating movement of the article engaging element for moving toward and from a station or press.

Third, there is a swivelling or twisting movement to orient the article engaging element in a rotational direction to fit the engaged surface of the article.

Fourth, there is a bending movement to put in proper attitude or orient the article engaging element in a generally vertical direction to fit the engaged surface of the article.

ELEVATOR

Figure 7:
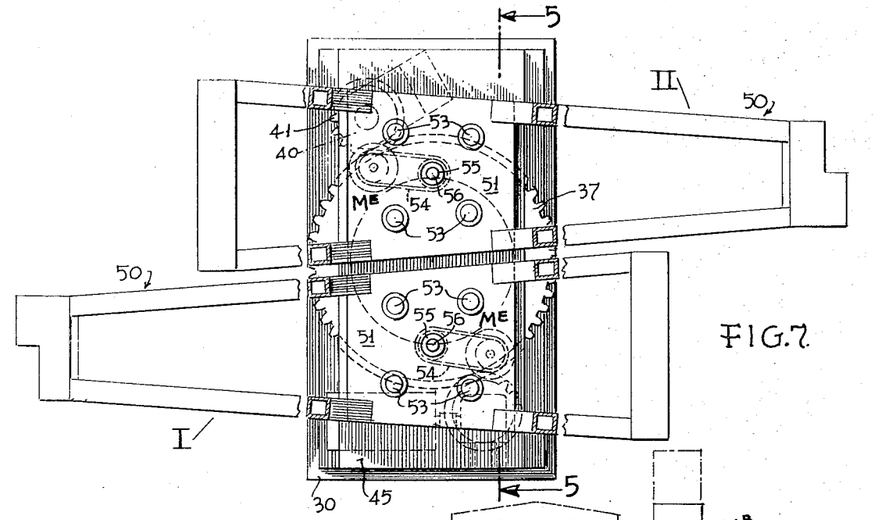
FIG. 7 is a horizontal section taken on the line 7—7 of FIG. 5, with some of the upper parts included for orientation.
Figures 8, 9:
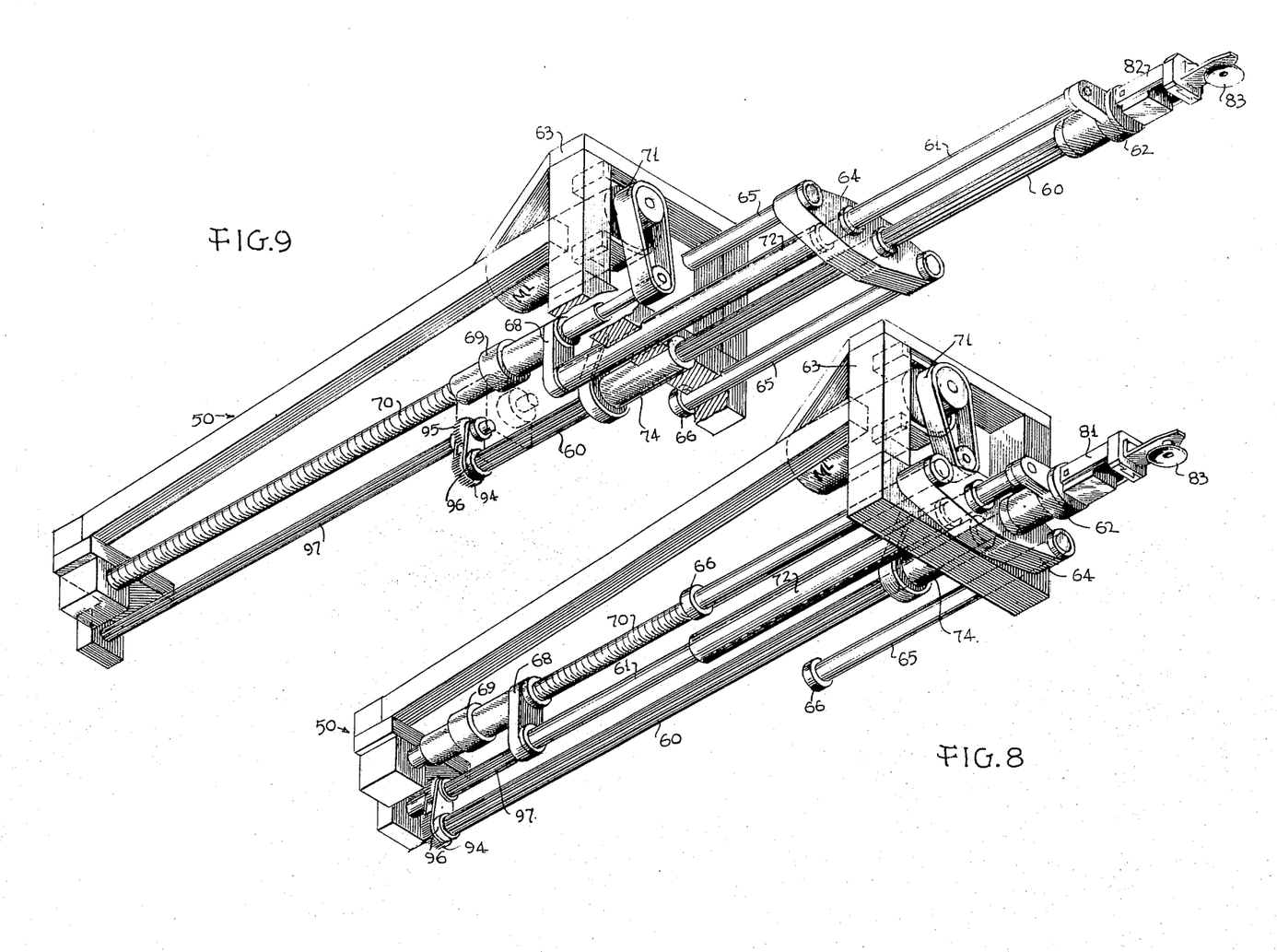
FIG. 8 is a side perspective view of one transfer unit separated from the base assembly, the parts being shown in the retracted position.
FIG. 9 is a view like FIG. 8 but with the parts in extended position.
Figure 10:
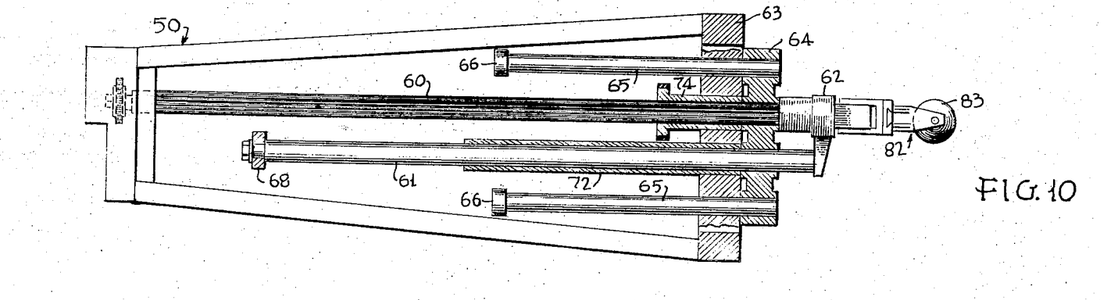
FIG. 10 is a partial horizontal section taken on the line 10—10 of FIG. 3.
Figure 11:
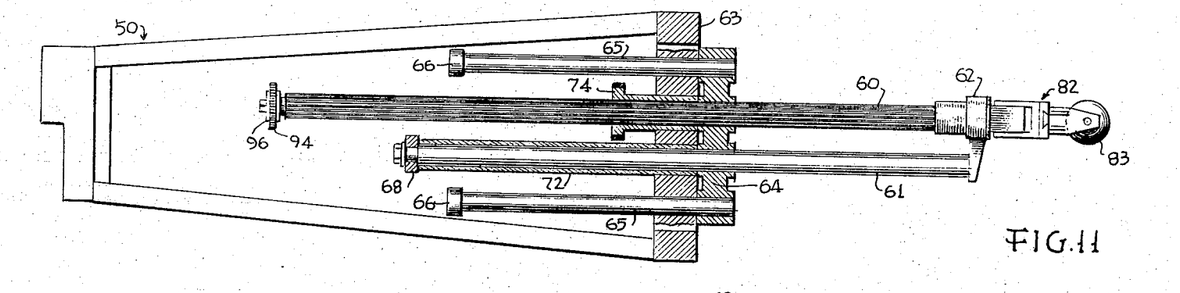
FIG. 11 is a view like FIG. 10 but showing the parts in an intermediate position.
Figure 12:
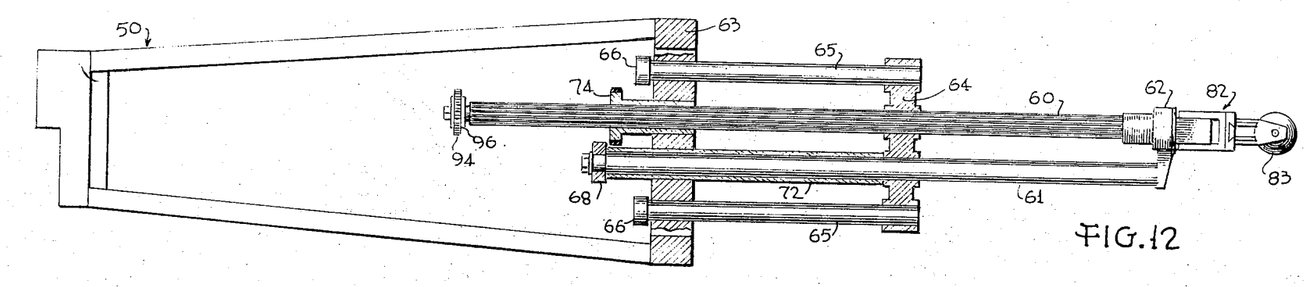
FIG. 12 is a view like FIG. 10 but showing the parts in fully extended position.

Each handling unit (FIGS. 5,7) includes a mounting frame which is generally designated by the numeral 50, the frame having a base 51 with guide holes (or tubes) 52 which slide up and down on guide rods 53 rigidly secured to the column table 45. The frame 50 is raised and lowered by elevating mechanism which comprises a programmable teach motor ME (motor-elevating) which, through a cog belt 54, drives a screw ball nut 55 turnable but non-slidable in the base 51, the nut turning on a central vertical screw 56 secured to the base table 45.

RECIPROCATOR

Referring to FIGS. 8–12, the means for producing linear reciprocatory or translatory movement comprises an exteriorly splined supporting rod or shaft 60 and a parallel fluid rod, tube, or shaft 61 carrying an element holder head assembly 62 on the outer end. The splined shaft 60 and the tube shaft 61 are slidable in guideways in a vertical frame portion 63 and in guideways of a supporting shuttle crosshead 64 carried on rods 65 which are slidable in a vertical frame portion 63 like the shafts 60 and 61. Stop lugs 66 are secured on the ends of rods 65. The crosshead 64 serves as auxiliary head load supporting means when the head is in its most extended position, having limited shuttle movement on its rod supports.

The inner end of the tube 61 has connected to it an arm or projection 68 of a screw ball nut unit 69 mounted on a screw shaft 70 which is mounted at its ends in bearings on the frame 50. The screw shaft 70 is turned in reversible directions by a cog belt 71 driven by a programmable teach motor ML (motor-linear) mounted on the frame 50. A sleeve 72 mounted on the crosshead 64 embraces the tube 61 but is shorter than the tube, about half the length, so that the crosshead is moved out by engagement of arm 68 with the end of sleeve 72 and is moved back when the head assembly 62 engages the crosshead. The auxiliary supporting crosshead thus has an idling shuttle movement as needed.

SWIVEL OR TWISTING

The splined shaft 60 (FIGS. 18–22) at its outer end carries an enlarged cylindrical portion 75 which is rotatable in the head 62 in bearings 76 which prevent endwise movement; and toward the rear end the splined shaft 60 is slidably mounted in an interiorly splined sleeve 74 which is rotatably mounted on the frame 50. The splined sleeve 74, and with it the splined shaft, is rotated by a cog belt 77, shaft 78, gear box 79, and a programmable teach motor MS (motor-swivel) mounted on the frame 50.

BENDING

Still referring to FIGS. 18–22, it is seen that the cylindrical portion 75 carries a transverse shaft 80 which at its projecting ends has rigidly mounted thereon paired arms 81 of a swinging frame 82 which carries the article engaging element 83, here a suction cup. It will be noted that the part 84 carrying the suction cup is removably mounted on the frame 82 so that gripping jaws or other article engaging means may be substituted if desired, power fluid control being present in the flexible tubular connection 85.

Interiorly the cross shaft 80 has a gear 86 rigidly secured thereon, the gear 86 being in mesh with a rack gear 87 of a box 88 slidably mounted within the cylindrical element 75. A screw shaft 90 is rigidly connected to the sliding box 88 and extends back into a rotatable screw ball nut 91 rigidly mounted in the enlarged cupped end 92 of a shaft 93 rotatably mounted within the splined shaft 60.

Figure 2:
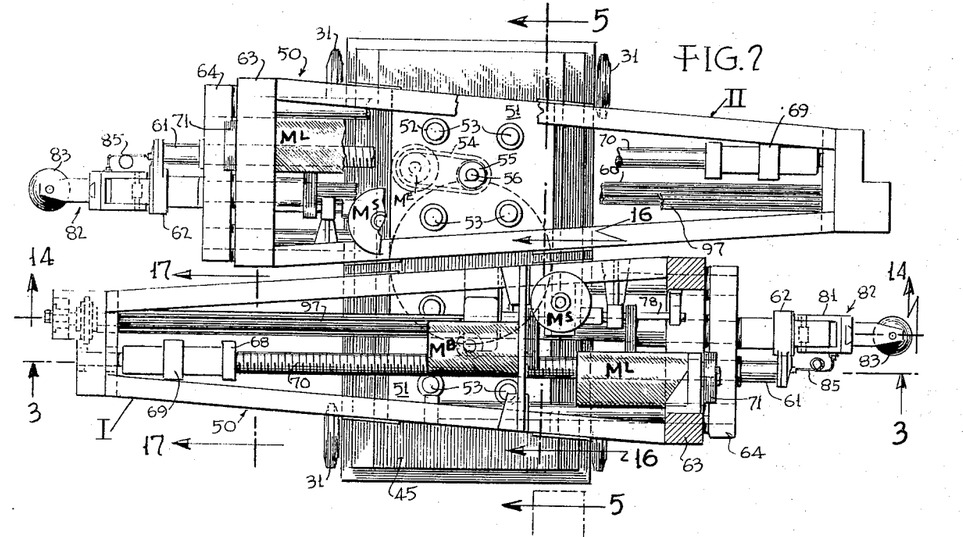
FIG. 2 is a top plan view, some parts being broken away.
Figure 3:
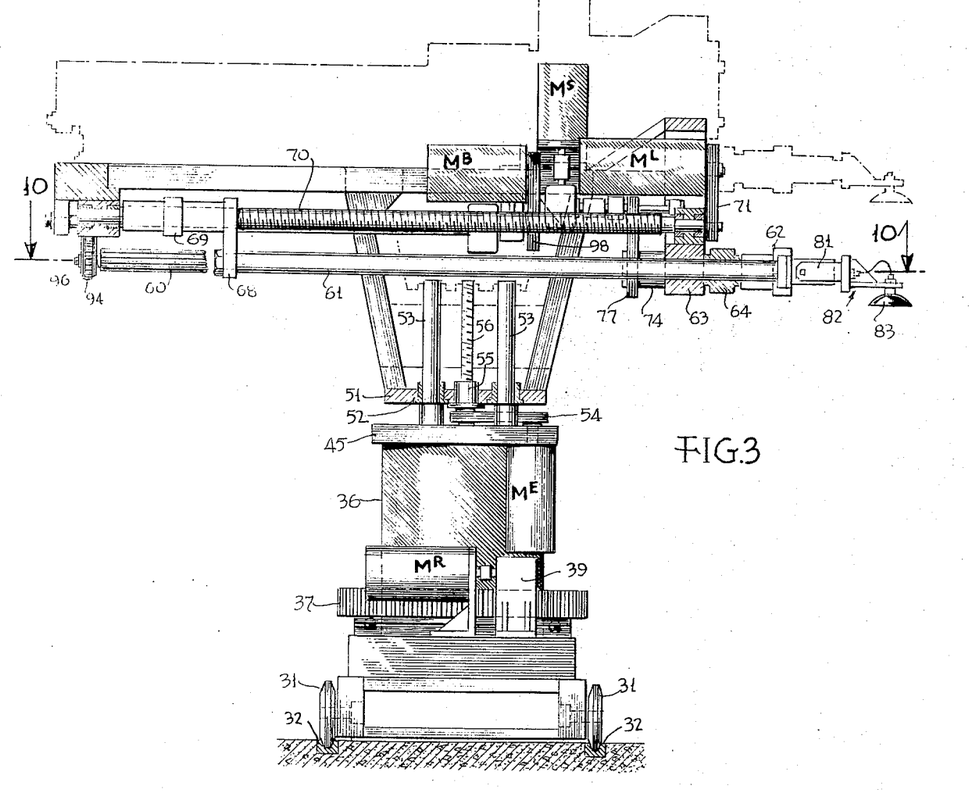
FIG. 3 is a side elevation and section showing the parts in a lower position and indicating an upper position in broken lines, the view being taken on the line 3—3 of FIG. 2.
Figures 13, 14:
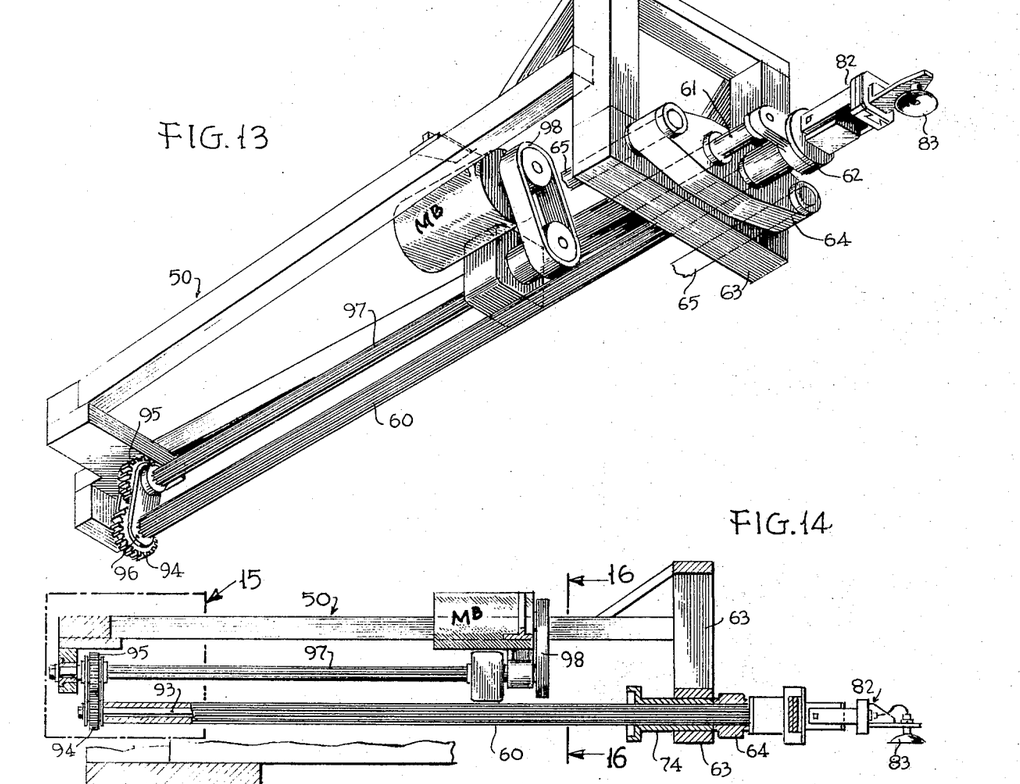
FIG. 13 is a partial vertical section taken on the line 13—13 of FIG. 2.
FIG. 14 is a nether perspective view of parts shown in FIG. 13, the view being somewhat enlarged.
Figures 15, 16, 17:
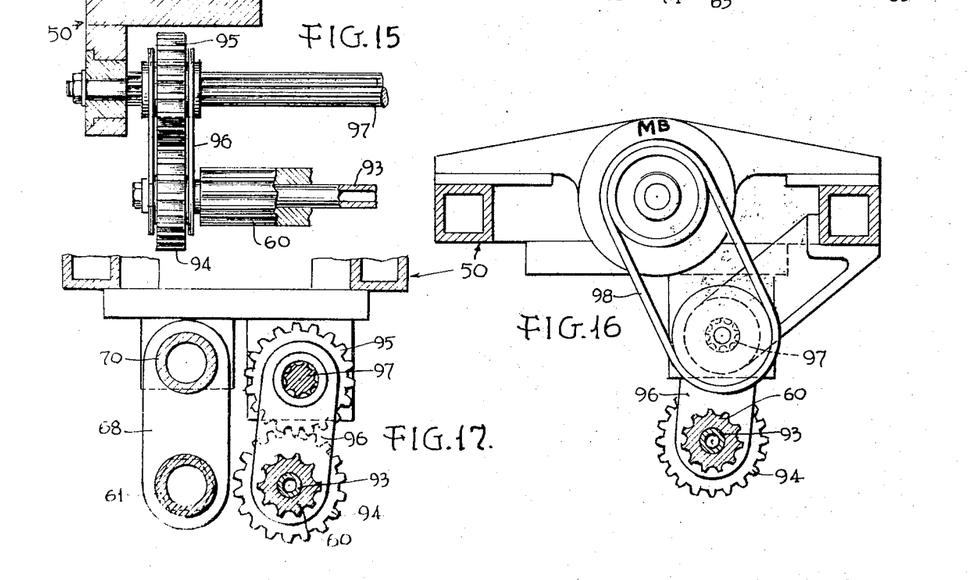
FIG. 15 is an enlarged view of the parts shown in area 15 of FIG. 13.
FIG. 16 is an enlarged vertical transverse section taken on the line 16—16 of FIG. 13.
FIG. 17 is an enlarged partial section taken on the line 17—17 of FIG. 2.
Figures 18, 19, 20:
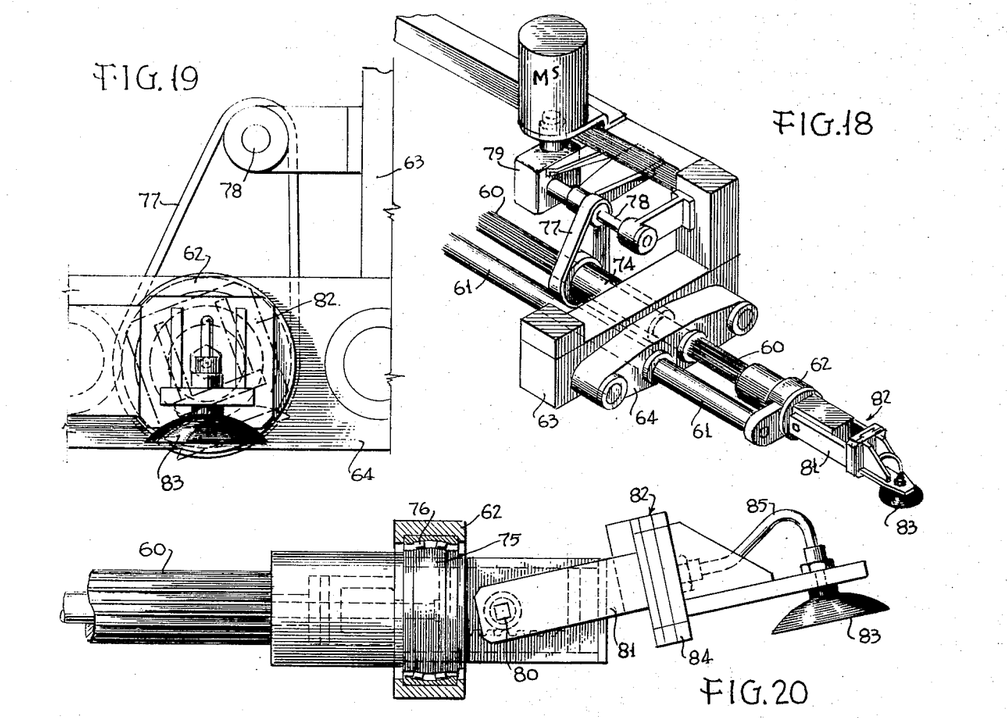
FIG. 18 is a partial enlarged perspective view of the article engaging element head and related parts.
FIG. 19 is an enlarged end elevational view of the parts shown in FIG. 18.
FIG. 20 is an enlarged partial side elevation of parts shown in FIG. 18, the article engaging element being shown in an upbent or uptilted position.
Figure 21:
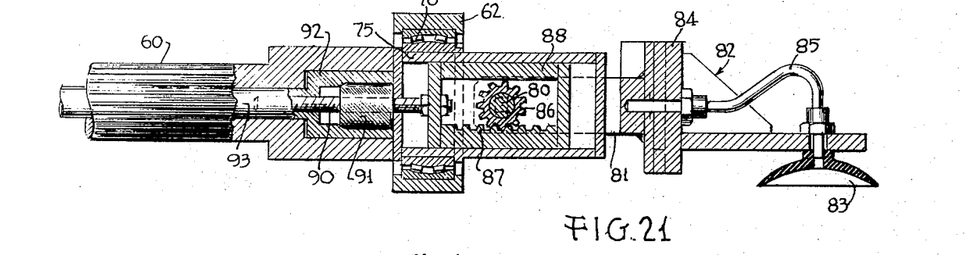
FIG. 21 is a vertical section of parts shown in FIG. 20, the view being taken on the line 21—21 of FIG. 22.
Figure 22:
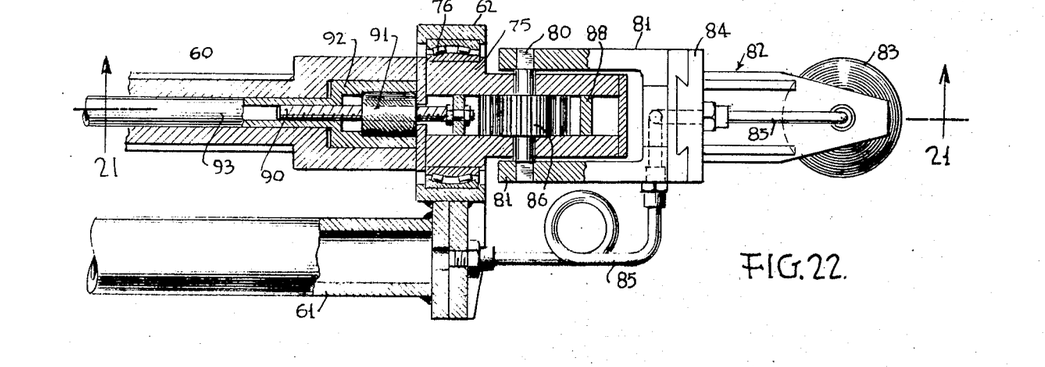
FIG. 22 is a horizontal section taken on the line 22—22 of FIG. 21.

At the rear end of the splined shaft 60 (FIGS. 2 and 3) the inner shaft 93 has a gear 94 mounted thereon, the gear 94 being driven (FIG. 15) by a mating gear 95 carried by a travelling frame 96 and slidably mounted on an exteriorly splined drive shaft 97. The shaft 97 is mounted (FIG. 14) in fixed bearings in the frame 50 and is driven through a cog belt 98 by a programmable teach motor MB (motor-bend) mounted on frame 50.

OPERATION

Figure 4:
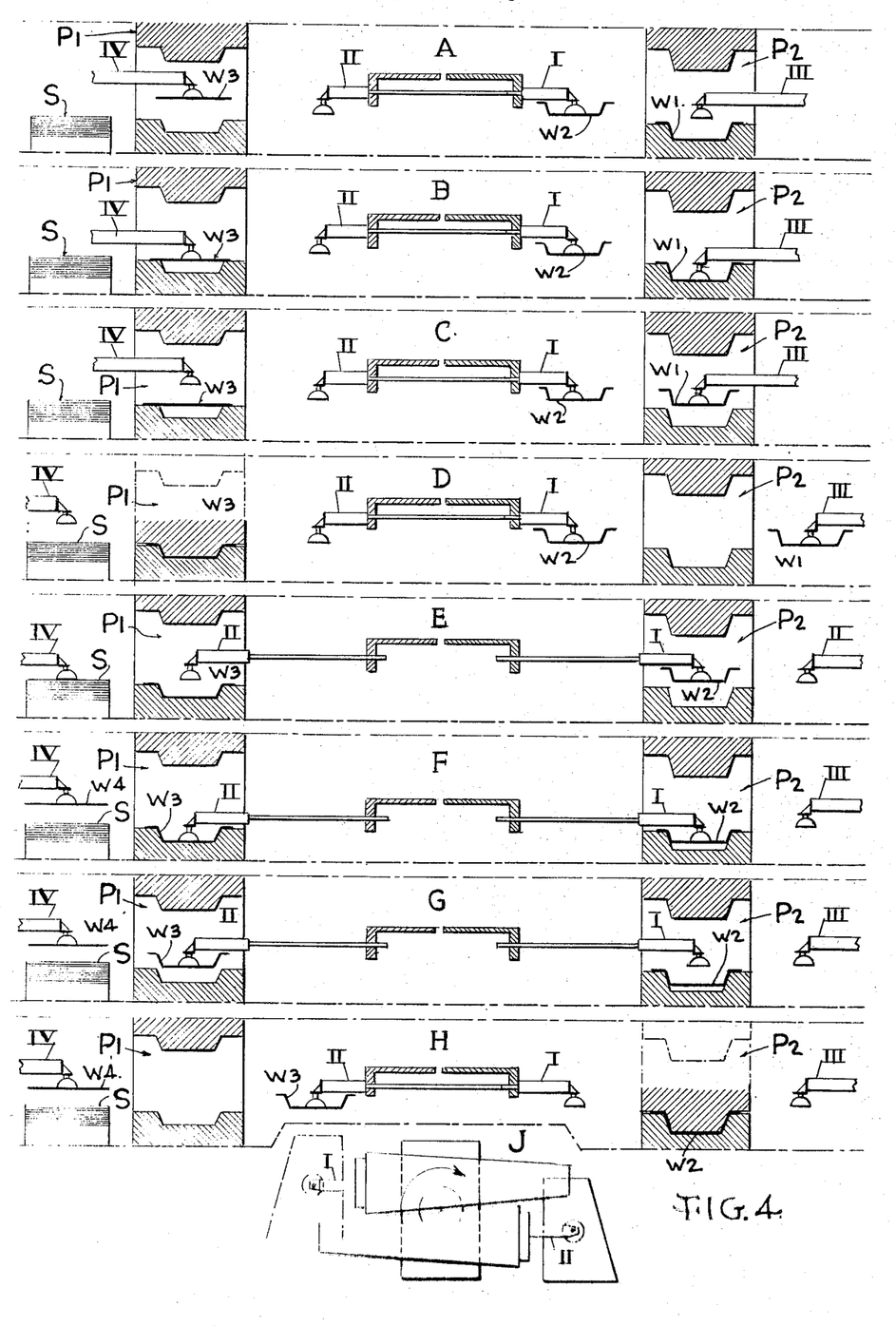
FIG. 4 is a composite cycle diagram showing article transfer between two forming presses in elevation in sub-views A to H, and sub-view J showing in plan how the article engaging elements or grippers would appear in rotated position.

The operation of the apparatus can be readily followed from the cycle diagram of FIG. 4.

In sub-view A a transfer unit I holds a workpiece of article W2 while an unloader III prepares to remove a second formed workpiece W1 from press P2. At the left a work piece W3 is being loaded into press P1 from a stack S by a feeder IV. The transfer unit II is retracted ready for extension to remove workpiece W3 from press P1 after formation.

In sub-view B the workpiece W3 has been lowered into press P1 and workpiece W1 has been engaged for removal from press P2. C the workpiece W3 has been dropped in press P1 and the workpiece W1 has been lifted in press P2.

In sub-view D the workpiece W3 is being formed in press P1 and workpiece W1 has been removed from press P2.

In sub-view E both presses are open and the article transfer units have been extended, unit I to deliver workpiece W2 which it has been holding and unit II to pick up workpiece W3.

In sub-view F the workpiece W3 has been engaged by unit I and workpiece W2 has been dropped by unit I. Feeder IV has picked up a new workpiece W4 from the stack S.

In sub-view G the workpiece W3 has been picked up by II and workpiece W2 has been dropped by I.

In sub-view H the workpiece W3 has been retracted from press P1 and the press is ready to receive a new workpiece W4. Unit I has retracted and press P2 is forming workpiece W2.

Sub-view J shows the column to have been turned by 180 degrees to bring the parts into the position shown just prior to that of sub-view A.

The next turning movement will be in the reverse direction to avoid entanglement of control lines and the like.

In the cycle diagram it is not necessary to show the bending and swivelling movements of the workpiece engaging elements, it being understood that they will be actuated in programmed sequence and extent as may be necessary.

All movements hereby provided are entirely independent of each other (except turning which rotates both units) and may be separately controlled as to sequence and extent of motion by teach-set programmed controls.

The screw ball nut actions make movements easy and quick and hold parts securely in desired positions with accuracy.

The reducing gear units employed herein also are of a type to hold parts securely in adjusted positions.

While one embodiment of the invention has been described for purposes of illustration, it is to be understood that there may be various embodiments and modifications within the general scope of the invention.

We claim:

1. Article transfer apparatus, comprising in combination, a support, a reciprocable head, a swivelling member carried by said reciprocable head, an article engaging element, mounted on said support, means for bending said article engaging element on said support, said means for bending including rack and pinion means actuated by a screw and nut traversing means, said screw and nut traversing means including a turnable supporting shaft, a turnable shaft therein for operating the screw and nut means and having a gear on its rear end, a parallel splined operating shaft, and a gear slidable on said operating shaft which meshes with the gear on said interior turnable shaft, means for swivelling said article engaging element on said support, means for lineally reciprocating said support, means for bodily elevating said support, and means for turning said support and elevating means through an angle about a vertical axis to move said article engaging element with an article from one station to another while positively holding the article throughout the full travel between stations.

2. Article transfer apparatus, comprising in combination, a traversable main base, a turnable support column rotatably mounted on said base, means for rotating said column, a handler unit having a frame mounted on said column, means for bodily elevating said handler frame on said column, reciprocable article transfer means mounted on said handler frame, means for reciprocating said transfer means, a supporting head on said transfer means, article engaging means carried by said supporting head, and means for separately swivelling and bending said article engaging means on said head, said means for rotating said column includes electro-mechanical means with positive holding means for a stopped position, said means for bodily elevating said frame on said column comprises electro-mechanical actuating means with screw and nut moving means, said means for reciprocating said transfer means comprises two parallel supporting shaft rods carrying said supporting head, and electro-mechanical actuating means, including an axially fixed turnable screw shaft and screw nut, connected to one of said supporting shaft rods, said means for swivelling said article engaging means including a turnable portion rotatably mounted on said head, a splined sleeve turning connection for a turnable one of said shaft rods connected to said turning portion, and electro-mechanical actuating means, including a reduction gear unit, for operating said splined sleeve to rotate said turnable shaft rod, and the means for bending said article engaging means including a swing frame mounted on a transverse shaft carried by said turnable portion on said head and carrying said article engaging means, a pinion gear on said transverse shaft, a rack gear meshing with said pinion gear and slidably mounted on said turnable portion, a screw and nut connection for reciprocating said rack gear, a rotary inner shaft mounted within said turnable shaft rod and connected to turn said screw and nut means, a gear on the rear end of said inner shaft, a splined drive shaft, a gear splined on said splined drive shaft and meshing with said end gear, a mount for said meshing gears slidable with the gear on said splined drive shaft, and electro-mechanical actuating means for turning said splined drive shaft.

3. Apparatus as set forth in claim 2, wherein two oppositely directed handler units are mounted on said turnable column for alternately transferring articles between opposite stations while positively holding them throughout their full travel between stations.

* * * * *